US011655422B2

(12) United States Patent
Touronen et al.

(10) Patent No.: US 11,655,422 B2
(45) Date of Patent: May 23, 2023

(54) PURIFICATION OF RECYCLED AND RENEWABLE ORGANIC MATERIAL

(71) Applicant: NESTE OYJ, Espoo (FI)

(72) Inventors: Jouni Touronen, Porvoo (FI); Meri Hovi, Porvoo (FI); Antti Pasanen, Porvoo (FI); Salla Likander, Porvoo (FI); Sami Toppinen, Porvoo (FI); Pekka Aalto, Porvoo (FI); Kari Jansson, Porvoo (FI); Marina Lindblad, Porvoo (FI); Mats Käldström, Porvoo (FI); Kaisa Lamminpää, Porvoo (FI); Andrea Perez Nebreda, Porvoo (FI)

(73) Assignee: NESTE OYJ, Espoo (FI)

( * ) Notice: Subject to any disclaimer, the term of this patent is extended or adjusted under 35 U.S.C. 154(b) by 157 days.

(21) Appl. No.: 17/261,736

(22) PCT Filed: Jul. 19, 2019

(86) PCT No.: PCT/EP2019/069482
§ 371 (c)(1),
(2) Date: Jan. 20, 2021

(87) PCT Pub. No.: WO2020/016405
PCT Pub. Date: Jan. 23, 2020

(65) Prior Publication Data
US 2021/0292656 A1    Sep. 23, 2021

(30) Foreign Application Priority Data

Jul. 20, 2018  (FI) ...................................... 20185651

(51) Int. Cl.
| | | |
|---|---|---|
| *C10G 67/02* | (2006.01) | |
| *C10G 69/06* | (2006.01) | |
| *C10G 3/00* | (2006.01) | |
| *C10G 65/02* | (2006.01) | |

(52) U.S. Cl.
CPC ................ *C10G 3/50* (2013.01); *C10G 3/40* (2013.01); *C10G 65/02* (2013.01); *C10G 67/02* (2013.01); *C10G 69/06* (2013.01); *C10G 2300/1003* (2013.01); *C10G 2300/1014* (2013.01); *C10G 2300/1018* (2013.01); *C10G 2300/202* (2013.01); *C10G 2300/4006* (2013.01); *C10G 2300/4012* (2013.01)

(58) Field of Classification Search
CPC . C10G 3/40; C10G 3/50; C10G 67/02; C10G 69/06; C10G 2300/202; C10G 2300/4012; C10G 2300/1014; C10G 2300/1018
See application file for complete search history.

(56) References Cited

U.S. PATENT DOCUMENTS

| | | |
|---|---|---|
| 2,524,088 A | 10/1950 | Shaw |
| 3,503,866 A | 3/1970 | Skripek et al. |
| 4,097,369 A | 6/1978 | Ebel et al. |
| 4,151,072 A | 4/1979 | Johnson et al. |
| 4,160,725 A | 7/1979 | Josis et al. |
| 4,241,227 A | 12/1980 | Stonner et al. |
| 4,252,637 A | 2/1981 | Knorre et al. |
| 4,328,128 A | 5/1982 | Stanulonis et al. |
| 5,049,258 A | 9/1991 | Keim et al. |
| 5,449,797 A | 9/1995 | Estes et al. |
| 5,514,632 A | 5/1996 | Chester et al. |
| 6,072,065 A | 6/2000 | Chavet |
| 6,586,638 B1 | 7/2003 | Zhang et al. |
| 8,067,656 B2 | 11/2011 | Luo et al. |
| 8,920,755 B2 | 12/2014 | Cleverdon et al. |
| 9,347,178 B2 | 5/2016 | Powell et al. |
| 9,353,478 B2 | 5/2016 | Powell et al. |
| 9,382,483 B2 | 7/2016 | Knuuttila et al. |
| 9,399,836 B2 | 7/2016 | Powell et al. |

(Continued)

FOREIGN PATENT DOCUMENTS

| | | |
|---|---|---|
| CA | 894222 A | 2/1972 |
| CN | 102786986 A | 11/2012 |

(Continued)

OTHER PUBLICATIONS

First Office Action dated Feb. 15, 2022, issued in the corresponding Chinese Patent Application No. 2019800477596, 15 pages including 6 pages of English Translation.
Office Action dated Mar. 1, 2022, issued in the corresponding Japanese Patent Application No. 2021-502416, 4 pages including 2 pages of English Translation.
Office Action dated Mar. 1, 2022, issued in the corresponding Japanese Patent Application No. 2021-502417, 10 pages including 6 pages of English Translation.
Office Action dated Mar. 1, 2022, issued in the corresponding Japanese Patent Application No. 2021-502426, 5 pages including 3 pages of English Translation.
Office Action dated Mar. 8, 2022, issued in the corresponding Japanese Patent Application No. 2021-502928, 8 pages including 5 pages of English Translation.

(Continued)

*Primary Examiner* — Randy Boyer
(74) *Attorney, Agent, or Firm* — Buchanan Ingersoll & Rooney PC (57) ABSTRACT

A method is disclosed of purifying a recycled or renewable organic material, wherein the recycled or renewable organic material includes more than 1 ppm silicon as silicon compounds. Exemplary steps include (a) providing the recycled or renewable organic material; (b) heat treating the recycled or renewable organic material to form a heat treated recycled or renewable organic material, wherein the at least part of silicon compounds present in the recycled or renewable organic material are converted to volatile silicon compounds, and (c) evaporating volatile silicon compounds from the heat treated recycled or renewable organic material to obtain recycled or renewable organic material fraction containing less silicon than the recycled or renewable organic material provided in step (a).

33 Claims, 2 Drawing Sheets

(56) References Cited

U.S. PATENT DOCUMENTS

| | | | |
|---|---|---|---|
| 9,593,448 B2 | 3/2017 | Powell et al. | |
| 9,656,185 B2 | 5/2017 | McGehee et al. | |
| 9,663,720 B2 | 5/2017 | Nousiainen et al. | |
| 9,688,919 B2 | 6/2017 | Vilonen et al. | |
| 9,932,530 B2 | 4/2018 | Garg et al. | |
| 10,023,810 B2 | 7/2018 | Nousiainen et al. | |
| 10,300,407 B2 | 5/2019 | McGehee et al. | |
| 10,518,194 B2 | 12/2019 | McGehee et al. | |
| 10,815,428 B2 | 10/2020 | Nousiainen et al. | |
| 2005/0101761 A1 | 5/2005 | Lambert et al. | |
| 2005/0240065 A1 | 10/2005 | Blaschke et al. | |
| 2006/0167291 A1 | 7/2006 | Te et al. | |
| 2007/0170091 A1 | 7/2007 | Monnier et al. | |
| 2008/0314799 A1 | 12/2008 | Li et al. | |
| 2009/0229172 A1 | 9/2009 | Brady et al. | |
| 2009/0250376 A1 | 10/2009 | Brandvoid et al. | |
| 2010/0130800 A1 | 5/2010 | Luo et al. | |
| 2011/0138680 A1 | 6/2011 | Dandeu et al. | |
| 2012/0088943 A1 | 4/2012 | Knuuttila et al. | |
| 2012/0116134 A1 | 5/2012 | Bozzano et al. | |
| 2013/0066132 A1 | 3/2013 | Cleverdon et al. | |
| 2013/0072730 A1 | 3/2013 | Knuuttila et al. | |
| 2013/0090502 A1 | 4/2013 | Laakkonen et al. | |
| 2013/0158329 A1 | 6/2013 | Brandvold | |
| 2013/0305598 A1 | 11/2013 | Hamilton et al. | |
| 2013/0345487 A1 | 12/2013 | Baird et al. | |
| 2014/0005451 A1 | 1/2014 | Mezza et al. | |
| 2014/0014593 A1 | 1/2014 | McGehee et al. | |
| 2014/0275666 A1 | 9/2014 | Bauer et al. | |
| 2015/0052807 A1 | 2/2015 | Nousiainen et al. | |
| 2015/0059354 A1 | 3/2015 | Gutierrez et al. | |
| 2015/0251168 A1 | 9/2015 | Kettunen et al. | |
| 2015/0361356 A1* | 12/2015 | Garg | C10G 65/04 208/181 |
| 2016/0060540 A1 | 3/2016 | Ouni et al. | |
| 2016/0130509 A1 | 5/2016 | Nousiainen et al. | |
| 2016/0177188 A1 | 6/2016 | Vilonen et al. | |
| 2016/0177201 A1 | 6/2016 | Pandranki et al. | |
| 2016/0186067 A1 | 6/2016 | Powell et al. | |
| 2016/0257888 A1 | 9/2016 | Nousiainen et al. | |
| 2016/0289576 A1 | 10/2016 | Eilos | |
| 2017/0145318 A1 | 5/2017 | Myllyoja et al. | |
| 2017/0158967 A1 | 6/2017 | Reiner et al. | |
| 2017/0216741 A1 | 8/2017 | McGehee et al. | |
| 2019/0192995 A1 | 6/2019 | McGehee et al. | |
| 2019/0203154 A1 | 7/2019 | Malm | |
| 2020/0308505 A1 | 10/2020 | Dayton et al. | |
| 2021/0269722 A1 | 9/2021 | Touronen et al. | |
| 2021/0277324 A1 | 9/2021 | Toukoniitty et al. | |
| 2021/0284925 A1 | 9/2021 | Gao et al. | |
| 2021/0292653 A1 | 9/2021 | Touronen et al. | |
| 2021/0292656 A1 | 9/2021 | Touronen et al. | |
| 2021/0292657 A1 | 9/2021 | Toukoniitty et al. | |
| 2021/0301210 A1 | 9/2021 | Timken et al. | |
| 2021/0332300 A1 | 10/2021 | Timken | |
| 2022/0135891 A1 | 5/2022 | Toukoniitty et al. | |

FOREIGN PATENT DOCUMENTS

| | | |
|---|---|---|
| CN | 106552611 A | 4/2017 |
| CN | 107636124 A | 1/2018 |
| CN | 107892990 A | 4/2018 |
| CN | 107974265 A | 5/2018 |
| CN | 107974266 A | 5/2018 |
| CN | 108251156 A | 7/2018 |
| EP | 0072873 A1 | 3/1983 |
| EP | 0420651 A1 | 4/1991 |
| EP | 0420652 A1 | 4/1991 |
| EP | 0574272 A2 | 12/1993 |
| EP | 1396531 A2 | 3/2004 |
| EP | 2149593 A1 | 2/2010 |
| EP | 2930231 A1 | 10/2015 |
| JP | H0940970 A | 2/1997 |
| JP | H1161148 A | 3/1999 |
| JP | 2000169862 A | 6/2000 |
| JP | 2003034794 A | 2/2003 |
| JP | 2003253038 A | 9/2003 |
| JP | 2007224196 A | 9/2007 |
| JP | 2009155475 A | 7/2009 |
| JP | 2010509472 A | 3/2010 |
| JP | 2011515539 A | 5/2011 |
| JP | 2013544304 A | 12/2013 |
| JP | 2015528740 A | 10/2015 |
| KR | 20110089367 A | 8/2011 |
| KR | 20140060558 A | 5/2014 |
| SE | 352373 B | 12/1972 |
| WO | 2008058664 A1 | 5/2008 |
| WO | 2011015664 A2 | 2/2011 |
| WO | 2012069467 A1 | 5/2012 |
| WO | 2013089838 A1 | 6/2013 |
| WO | 2013156683 A1 | 10/2013 |
| WO | 2014001633 A1 | 1/2014 |
| WO | 2015087938 A1 | 6/2015 |
| WO | 2015101713 A1 | 7/2015 |
| WO | 2016053948 A1 | 4/2016 |
| WO | 2016094183 A2 | 6/2016 |
| WO | 2018024728 A1 | 2/2018 |
| WO | 2018025103 A1 | 2/2018 |
| WO | 2018025104 A1 | 2/2018 |
| WO | 2018058172 A1 | 4/2018 |
| WO | 2018127812 A1 | 7/2018 |

OTHER PUBLICATIONS

Energy Fossil, Recovery of Navy Distillate Fuel from Reclaimed Product, Dennis W. Brinkman & Marwin L. Whisman (Published Nov. 1984).

Fats and Oils: Formulating and Processing for Applications, Third Edition by Richard D. O'Brien (2009).

Finnish Office Action dated Apr. 23, 2019 for Application No. 2185650.

International Preliminary Report on Patentability issued in corresponding International Patent Application No. PCT/EP2019/069474 dated Dec. 15, 2020.

International Preliminary Report on Patentability issued in corresponding International Patent Application No. PCT/EP2019/069482 dated Jan. 21, 2021.

International Preliminary Report on Patentability issued in corresponding International Patent Application No. PCT/EP2019/069490 dated Jul. 15, 2020.

International Preliminary Report on Patentability issued in corresponding International Patent Application No. PCT/EP2019/069497 dated Oct. 9, 2020.

International Preliminary Report on Patentability issued in corresponding International Patent Application No. PCT/EP2019/069503 dated Sep. 20, 2020.

International Preliminary Report on Patentability issued in corresponding International Patent Application No. PCT/EP2019/069512 dated Sep. 20, 2020.

International Search Report (PCT/ISA/210) and Written Opinion (PCT/ISA/237) dated Dec. 19, 2019, by the European Patent Office as the International Searching Authority for International Application No. PCT/EP2019/069503.

International Search Report (PCT/ISA/210) and Written Opinion (PCT/ISA/237) dated Dec. 5, 2019, by the European Patent Office as the International Searching Authority for International Application No. PCT/EP2019/069474.

International Search Report (PCT/ISA/210) and Written Opinion (PCT/ISA/237) dated Nov. 12, 2019, by the European Patent Office as the International Search Authority for International Patent Application No. PCT/EP2019/069482.

International Search Report (PCT/ISA/210) and Written Opinion (PCT/ISA/237) dated Sep. 10, 2019, by the European Patent Office as the International Searching Authority for International Application No. PCT/EP2019/069497.

International Search Report (PCT/ISA/210) and Written Opinion (PCT/ISA/237) dated Sep. 10, 2019, by the European Patent Office as the International Searching Authority for International Application No. PCT/EP2019/069512.

(56) References Cited

OTHER PUBLICATIONS

International Search Report (PCT/ISA/210) with translation and Written Opinion (PCT/ISA/237) dated Nov. 12, 2019, by the European Patent Office as the International Searching Authority for International Application No. PCT/EP2019/069490.

Punkkinen Henna et al., Research Report: "Thermal conversion of plastic-containing waste: A Review" (2017).

Search Report dated Apr. 9, 2019 by the Finnish Patent and Registration Office for Application No. 20185651.

Search Report dated Nov. 12, 2018 by the Finnish Patent and Registration Office for Application No. 20185651.

Search Report dated Nov. 19, 2018 by the Finnish Patent and Registration Office for Application No. 20185653.

Search Report dated Nov. 20, 2018 by the Finnish Patent and Registration Office for Application No. 20185654.

Search Report dated Nov. 21, 2018 by the Finnish Patent and Registration Office for Application No. 20185655.

Search Report dated Nov. 21, 2018 by the Finnish Patent and Registration Office for Application No. 2185650.

Search Report dated Nov. 6, 2018 by the Finnish Patent and Registration Office for Application No. 20185652.

Mohd Zin, Rohani Binti, et al., "Process Design in Degumming and Bleaching of Palm Oil", Centre of Lipids Engineering and Applied Research (CLEAR), Universiti Teknologi Malaysia, Nov. 2006, 239 pages.

Pyl, Steven P., et al., "Wood-derived olefins by steam cracking of hydrodeoxygenated tall oils", Bioresource Technology 126, 2012, pp. 48-55, Elsevier Ltd.

Sigot, L., et al., "Adsorption of octamethylcyclotetrasiloxane on silica gel for biogas purification", Fuel, Jul. 8, 2014, vol. 135, pp. 205-209.

Vogt, E.T.C., et al., "Fluid catalytic cracking: recent developments on the grand old lady of zeolite catalysis", Chem. Soc. Rev., Sep. 18, 2015, pp. 7342-7370, The Royal Society of Chemistry.

Office Action (Communication) dated Mar. 30, 2022, by the European Patent Office in corresponding European Patent Application No. 19742575.4. (8 pages).

Office Action dated Mar. 17, 2022, by the U.S. Patent Office in corresponding U.S. Appl. No. 17/261,679.

First Office Action dated Feb. 15, 2022, by the Chinese Patent Office in corresponding Chinese Patent Application No. 2019800484072, and an English Translation of the Office Action. (18 pages).

Office Action dated Nov. 10, 2022, by the U.S. Patent and Trademark Office in U.S. Appl. No. 17/261,754.

Office Action dated Feb. 8, 2023, by the Korean Patent Office in corresponding Korean Patent Application No. 10-2021-7004485, and an English translation of the Office Action. (14 pages).

\* cited by examiner

PURIFICATION OF RECYCLED AND RENEWABLE ORGANIC MATERIAL

FIELD OF THE INVENTION

The present invention relates to a method of purifying recycled or renewable organic material, in particular removing silicon from recycled or renewable organic material comprising more than 1 ppm silicon as silicon compounds.

BACKGROUND OF THE INVENTION

In some cases recycled or renewable organic material contains high amounts of silicon (Si) as silicon compounds. Before catalytic processing of the recycled or renewable organic material these silicon impurities need to be removed from the material as silicon compounds are known catalyst poisons and should therefore be removed prior to hydrotreating to maximize the cycle length and profits of the hydrotreater.

In particular tall oil pitch (TOP) contains silicon impurities, most likely originating from anti-fouling agents used in upstream processing. Anti-fouling agents comprise e.g. polydimethylsiloxanes (PDMS), which are soluble in oil and are therefore difficult to remove from oil. Also, some other impurities can come from sand or dirt during wood collection. Removal of silicon impurities prior to hydrotreatment is required to avoid decreased lifetime of the catalyst in the unit. Conventional purification methods, such as filtration or bleaching, are not adequate to remove the silicon impurities effectively.

BRIEF DESCRIPTION OF THE INVENTION

An object of the present invention is thus to provide a method so as to overcome the above problems. The objects of the invention are achieved by a method which is characterized by what is stated in the independent claims. The preferred embodiments of the invention are disclosed in the dependent claims.

The invention is based on the surprising realization that recycled or renewable organic material containing high amounts of silicon compounds may be purified by a method that leads to removal of Si from the recycled or renewable organic material as the recycled or renewable organic material is subjected to (b) heat treating the recycled or renewable organic material, preferably at 180 to 325° C., to form a heat treated recycled or renewable organic material, wherein at least part of silicon compounds present in the recycled or renewable organic material are converted to volatile silicon compounds, and thereafter (c) evaporating volatile silicon compounds from the heat treated recycled or renewable organic material in one or more stages, preferably at 145 to 250° C., under reduced pressure, wherein at least part, preferably from 1 to 10 w %, of the heat treated recycled or renewable organic material evaporates.

The order of the individual process steps (b) and (c), and the conditions in heat treatment step (b) enable maximal silicon removal from the recycled or renewable organic material.

The method allows use of low quality recycled or renewable organic material feeds as a feedstock in hydrotreating, e.g. in processes producing high quality renewable fuels and/or chemicals.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The present invention provides a method of purifying a recycled or renewable organic material.

The term "recycled or renewable organic material" refers to organic material, i.e. material containing carbon, obtained 1) from a natural resource which replenishes to overcome recourse depletion caused by its usage and consumption or 2) from a raw or processed material that is recovered from a waste for reuse. The recycled or renewable organic material characteristically comprises aliphatic compounds having a carbon chain of from 4 to 30 carbon atoms, particularly from 12 to 22 carbon atoms. Typical examples of such aliphatic compounds are fatty acids or esters thereof, in particular wherein the fatty acids have an aliphatic chain of from 4 to 30 carbon atoms, more particularly from 12 to 22 carbon atoms. The recycled or renewable organic material typically comprises at least 50 wt % aliphatic compounds of the total weight of the recycled or renewable organic material.

Typically the recycled or renewable organic material refers to fats and/or oils of plant, microbial, algal, and/or animal origin. It also refers to any waste stream received from processing of such oils and/or fats. The recycled or renewable organic material may be in an unprocessed form (e.g. animal fat), or a processed form (used cooking oil). The recycled or renewable organic material also refers to fossil waste-based oils and waste oils.

The term "plant based fats and oils" refers to fat and/or oils of plant origin i.e. oils that can originate directly from plants or can be byproducts from various industrial sectors, such as agriculture or forest industry.

Examples of plant based fats and oils of the present invention include, but are not limited to, sludge palm oil, rapeseed oil, canola oil, colza oil, sunflower oil, soybean oil, hemp oil, olive oil, linseed oil, cottonseed oil, mustard oil, palm oil, *arachis* oil, castor oil and coconut oil.

Other examples of plant based fats and oils include biocrudes and bio oils. Biocrudes and bio oils are produced from biomass, in particular from lignocellulosic biomass, with various liquefying methods, such as hydrothermal liquefaction, or pyrolysis, in particular fast pyrolysis.

The term "biocrude" refers to oils produced from biomass by employing hydrothermal liquefaction. The term "bio oil" refers to pyrolysis oils produced from biomass by employing pyrolysis. The term "biomass" refers to material derived from recently living organisms, which includes plants, animals and their byproducts. The term "lignocellulosic biomass" refers to biomass derived from plants or their byproducts. Lignocellulosic biomass is composed of carbohydrate polymers (cellulose, hemicellulose) and an aromatic polymer (lignin).

The term "pyrolysis" refers to thermal decomposition of materials at elevated temperatures in a non-oxidative atmosphere. The term "fast pyrolysis" refers to thermochemical decomposition of biomass through rapid heating in absence of oxygen. The term "hydrothermal liquefaction" (HTL) refers to a thermal depolymerization process used to convert wet biomass into crude-like oil under moderate temperature and high pressure.

Examples of bio oil and biocrude produced from lignocellulosic biomass, e.g. materials like forest harvesting residues or byproducts of a saw mill, are lignocellulosic pyrolysis liquid (LPL), produced by employing fast pyrolysis, and HTL-biocrude, produced by employing hydrothermal liquefaction.

Further examples of plant based fats and oils include crude tall oil (CTO), obtained as a by-product of the Kraft process (wood pulping), and its derivatives, such as tall oil pitch (TOP), crude fatty acid (CFA), tall oil fatty acid (TOFA) and distilled tall oil (DTO).

Crude tall oil comprises resin acids, fatty acids, and unsaponifiables. Resin acids are a mixture of organic acids derived from oxidation and polymerization reactions of terpenes. The main resin acid in crude tall oil is abietic acid but abietic derivatives and other acids, such as primaric acid are also found. Fatty acids are long chain monocarboxylic acids and are found in hardwoods and softwoods. The main fatty acids in crude tall oil are oleic, linoleic and palmitic acids. Unsaponifiables cannot be turned into soaps as they are neutral compounds which do not react with sodium hydroxide to form salts. They include sterols, higher alcohols and hydrocarbons. Sterols are steroids derivatives which also include a hydroxyl group.

The term "tall oil pitch (TOP)" refers to residual bottom fraction from crude tall oil (CTO) distillation processes. Tall oil pitch typically comprises from 34 to 51 wt % free acids, from 23 to 37 wt % esterified acids, and from 25 to 34 wt % unsaponifiable neutral compounds of the total weight of the tall oil pitch. The free acids are typically selected from a group consisting of dehydroabietic acid, abietic and other resin acids. The esterified acids are typically selected from a group consisting of oleic and linoleic acids. The unsaponifiables neutral compounds are typically selected from a group consisting of diterpene sterols, fatty alcohols, sterols, and dehydrated sterols.

The term "crude fatty acid (CFA)" refers to fatty acid-containing materials obtainable by purification (e.g., distillation under reduced pressure, extraction, and/or crystallization) of CTO. The term "tall oil fatty acid (TOFA)" refers to fatty acid rich fraction of crude tall oil (CTO) distillation processes. TOFA typically comprises mainly fatty acids, typically at least 80 wt % of the total weight of the TOFA. Typically TOFA comprises less than 10 wt % rosin acids.

The term "distilled tall oil (DTO)" refers to resin acid rich fraction of crude tall oil (CTO) distillation processes. DTO typically comprises mainly fatty acids, typically from 55 to 90 wt %, and rosin acids, typically from 10 to 40 wt % rosin acids, of the total weight of the DTO. Typically DTO comprises less than 10 wt % unsaponifiable neutral compounds of the total weight of the distilled tall oil.

The term "animal based fats and oils" refers to fats and/or oils of animal origin i.e. lipid materials derived from animals. Examples of animal based fats and oils include, but are not limited to, such as suet, tallow, blubber, lard, train oil, milk fat, fish oil, poultry oil and poultry fat.

The term "microbial oils" refers to triglycerides (lipids) produced by microbes.

The term "algal oils" refers to oils derived directly from algae.

The term "fossil waste-based oils" refers to oils produced from waste streams like waste plastics or end-life-tires. Examples of fossil waste-based oils include waste plastic pyrolysis oil (WPPO) and end-life-tire pyrolysis oil (ELTPO).

The term "waste oils" refers to any oils that, through contamination, have become unsuitable for their original purpose due to the presence of impurities or loss of original properties. Examples of waste oils are used lubricant oils (ULO), hydraulic oils, transformer oils or oils used in metal working.

In the present invention the recycled or renewable organic material is typically selected from a group consisting of plant based fats and oils, animal based fats and oils, fossil waste-based oils, waste oils, algal oils and microbial oils.

Particular examples of the recycled or renewable organic material of the present invention include, but are not limited to, animal based fats and oils, such as suet, tallow, blubber, lard, train oil, milk fat, fish oil, poultry oil, and poultry fat; plant based fats and oils, such as sludge palm oil, rapeseed oil, canola oil, colza oil, sunflower oil, soybean oil, hemp oil, olive oil, linseed oil, cottonseed oil, mustard oil, palm oil, *arachis* oil, castor oil, coconut oil, lignocellulosic pyrolysis liquid (LPL), HTL biocrude, crude tall oil (CTO), tall oil pitch (TOP), crude fatty acid (CFA), tall oil fatty acid (TOFA) and distilled tall oil (DTO); microbial oils; algal oils; recycled fats or various waste streams of the food industry, such as used cooking oil, yellow and brown greases; free fatty acids, any lipids containing phosphorous and/or metals, oils originating from yeast or mold products, recycled alimentary fats; starting materials produced by genetic engineering, and any mixtures of said feedstocks.

In an example is the present invention the recycled or renewable organic material is selected from a group consisting of crude tall oil (CTO), tall oil pitch (TOP), tall oil fatty acid (TOFA), crude fatty acid (CFA), tall oil fatty acid (TOFA) and distilled tall oil (DTO); more particularly the recycled or renewable organic material is crude tall oil (CTO) or tall oil pitch (TOP).

The recycled or renewable organic material to be treated by the present method contains high amounts of silicon compounds. The recycled or renewable organic material of the present invention comprises more than 1 ppm Si. In particular the recycled or renewable organic material of the present invention comprises more than 10 ppm Si, more particularly the recycled or renewable organic material of the present invention comprises more than 15 ppm Si, and even more particularly the recycled or renewable organic material of the present invention comprises more than 20 ppm Si.

The recycled or renewable organic material to be treated by the present method may also comprise further impurities e.g. impurities comprising phosphorus and/or metals in the form of phospholipids, soaps and/or salts. The impurities may for example be in the form of phosphates or sulfates, iron salts or organic salts, soaps or phospholipids. The metal impurities that may be present in the biomass-based lipid material are for example alkali metals or alkali earth metals, such as sodium or potassium salts, or magnesium or calcium salts, or any compounds of said metals.

Accordingly provided herein is a method of purifying a recycled or renewable organic material, wherein the recycled or renewable organic material comprises more than 1 ppm silicon as silicon compounds, comprising the steps of (a) providing the recycled or renewable organic material;

(b) heat treating the recycled or renewable organic material to form a heat treated recycled or renewable organic material, wherein the at least part of silicon compounds present in the recycled or renewable organic material are converted to volatile silicon compounds, and (c) evaporating volatile silicon compounds from the heat treated recycled or renewable organic material, to obtain (i) a vapor fraction comprising the major part of volatile silicon compounds, and (ii) a heat treated recycled or renewable organic material fraction comprising less silicon than the recycled or renewable organic material provided in step (a).

The heat treated recycled or renewable organic material fraction advantageously comprises less silicon than the recycled or renewable organic material provided in step (a), preferably less than 50%, more preferably less than 30% of the original silicon content of the recycled or renewable organic material provided in step (a).

The method optionally further comprises (d) hydrotreating the heat treated recycled or renewable organic material fraction in a presence of a hydrotreating catalyst to obtain purified recycled or renewable organic material.

The term "hydrotreating" refers to a chemical engineer process in which reaction of hydrogen is used to remove impurities, such as oxygen, sulfur, nitrogen, phosphorous, silicon and metals, especially as part of oil refining.

Hydrotreating can be performed in one or several steps in one or more reactor units or catalyst beds.

Step (d) is typically achieved under continuous hydrogen flow. For achieving optimal results the continuous hydrogen flow is step (d) preferably has H2/feed ratio from 500 to 2000 n-L/L, more preferably from 800 to 1400 n-L/L.

In step (d) hydrotreatment is advantageously performed at a temperature from 270 to 380° C., preferably from 275 to 360° C., more preferably from 300 to 350° C. Typically the pressure in step (d) is from 4 to 20 MPa.

The hydrotreating catalyst is step (d) preferably comprises at least one component selected from IUPAC group 6, 8 or 10 of the Periodic Table. Preferably the hydrotreating catalyst in step (d) is a supported Pd, Pt, Ni, NiW, NiMo or a CoMo catalysts and the support is zeolite, zeolite-alumina, alumina and/or silica, preferably NiW/Al$_2$O$_3$, NiMo/Al$_2$O$_3$ or CoMo/Al$_2$O$_3$. In particular the hydrotreating catalyst is a sulfided NiW, NiMO or CoMo catalyst.

The time during which the recycled or renewable organic material is heated and held at the desired temperature, i.e. residence time, is typically from 1 to 300 min, preferably from 5 to 240 min, more preferably from 30 to 90 min in step (d).

An applicable hydrotreatment step (d) provides a purified hydrotreated recycled or renewable organic material. The purified hydrotreated recycled or renewable material advantageously comprises less than 20%, preferably less than 10%, more preferably less than 5%, of the original silicon content of the recycled or renewable organic material provided in step (a).

For achieving optimal results part of the hydrotreated recycled or renewable organic material may be recycled in step (d). Preferably the ratio of the fresh feed i.e. purified recycled or renewable organic material obtained in step (c) to the recycled hydrotreated recycled or renewable organic material is from 2:1 to 20:1.

In a particular example step (d) is accomplished by (d1) hydrodeoxygenating (HDO) the heat treated recycled or renewable organic material fraction. This is preferably achieved in a presence of a HDO catalyst at a temperature from 290 to 350° C. under pressure from 4 to 20 MPa and under continuous hydrogen flow.

The term "hydrodeoxygenation (HDO)" refers to removal of oxygen as water by the means of molecular hydrogen under the influence of a (HDO) catalyst.

The HDO catalyst may for example be selected from a group consisting of NiMO-, CoMo-, NiW-catalysts and any mixtures thereof. Preferably the HDO catalyst is sulfided NiW, NiMo or CoMo catalyst.

Advantageously, the continuous hydrogen flow has H2/feed ratio from 500 to 2000 n-L/L, preferably from 800 to 1400 n-L/L.

Preferably step (d1) is performed to obtain purified recycled or renewable organic material comprising less than 1 wt % oxygen.

In another example step (d) is accomplished by (d2) hydrodesulfurizing (HSD) the heat treated recycled or renewable organic material fraction. The term "hydrodesulfurisation (HDS)" refers to removal of sulfur as hydrogensulfide by the means of molecular hydrogen under the influence of a (HDS) catalyst.

In another example step (d) is accomplished by (d3) hydrometaillizing (HDM) the heat treated recycled or renewable organic material fraction. The term "hydrodemetallization (HDM)" refers to removal of metals by trapping them with a (HDM) catalyst.

In another example step (d) is accomplished by (d4) hydrodenitrificating (HDN) the heat treated recycled or renewable organic material fraction. The term "hydrodenitrification (HDN)" refers to removal of nitrogen by the means of molecular hydrogen under the influence of a (HDN) catalyst.

In another example step (d) is accomplished by (d5) hydrodearomatizing (HDA) the heat treated recycled or renewable organic material fraction. The term "hydrodearomatisation (HDA)" refers to saturation or ring opening of aromatics by the means of molecular hydrogen under the influence of a (HDA) catalyst.

In step (b) the recycled or renewable organic material is heated to cause thermal reactions that disrupt silicon containing impurities comprised in the recycled or renewable organic material creating volatile silicon compounds material that can be subsequently removed from the heat treated recycled or renewable organic material. In particular polydimethylsiloxanes (PDMS) resulting from anti-fouling agents degrade to volatile polydimethylcyclosiloxanes (PDMCS) under the process conditions.

In step (b) the water content in the feed, i.e. the recycled or renewable organic material may advantageously vary in from 200 to 5000 ppm. If the recycled or renewable organic material comprises more than 5000 ppm water, it may be removed from the feed before step (b) by any suitable means known to a skilled person for lowering the water content in the recycled or renewable organic material below 5000 ppm.

The heat treatment of step (b) typically takes place at any temperature from 180 to 325° C. For achieving optimal results, step (b) is performed at 200 to 300° C., preferably at 240 to 280° C.

The time during which the recycled or renewable organic material is heated and held at the desired temperature, i.e. residence time, is typically from 1 to 300 min, preferably from 5 to 90 min, more preferably from 20 to 40 min in step (b).

The pressure in the heat treatment in step (b) is typically from 500 to 5000 kPa, preferably from 800 to 2000 kPa.

The pressure range in step (b) is dictated by volatility of water and it is advantageous to keep the heat treatment pressure slightly higher than the balance pressure of water boiling in particular heat treatment temperature. Too low pressure may drive volatile components like water and fractions of fatty acids into gas phase. Carry over of organic volatiles is enhanced by presence of water or stripping.

After the heat treatment of step (b) the volatiles created due to the heat treatment and/or otherwise present in the heat treated recycled or renewable organic material are removed. Accordingly in step (c) the heat treated recycled or renewable organic material is subjected to evaporation of the volatile silicon compounds from the heat treated recycled or renewable organic material in one or more stages. In step (c) the evaporation is advantageously achieved at any temperature from 145 to 250° C., in particular at from 150° C. to 225° C. For achieving optimal results, step (c) is performed at from 160° C. to 200° C., preferably at from 160 to 180° C.

The reduced pressure in step (c) is such that evaporation of volatile Si compounds is achieved. Typically the pressure in step (c) is from 0.1 to 5 kPa, preferably from 0.1 to 3 kPa.

The evaporated mass should preferably be arranged to evaporation of 1 to 10 wt %, preferably from 1 to 8 wt %, more preferably from 1 to 5 wt %, even more preferably from 1 to 3 wt %, of the heat treated recycled or renewable organic material.

An applicable evaporation step (c) provides (i) a vapor fraction comprising the major part of volatile silicon compounds, and (ii) a heat treated recycled or renewable organic material fraction comprising less than 50%, preferably less than 30%, of the original silicon content of the recycled or renewable organic material provided in step (a).

The evaporation in step (c) may be accomplished by any evaporation method found suitable by a skilled person for separation of the volatiles from the heat treated recycled or renewable organic material. Suitable examples include, but are not limited to, falling film evaporation, rising film evaporation, thin film evaporation and flash evaporation, for example. The evaporation may be accomplished in one or more stages. It is also to be understood that several evaporation methods, e.g. thin film evaporation and flash evaporation, may be combined. Preferable evaporation method of the present invention is one or multistage flash evaporation. Due to high pressure difference in flash vessel, less evaporation mass is needed in flash evaporation to provide better mass transfer as compared to thin film evaporation. For example, applying the same method and equipment as in a typical crude tall oil (CTO) thin film evaporation process for tall oil pitch (TOP) after heat treatment remarkably increases heat consumption as compared to flash evaporation.

The optimum temperature, pressure, evaporated mass, and how many flash stages to use depends on composition and quality of the recycled or renewable organic material and also on the heat treatment parameters (temperature, pressure and residence time) of step (b).

Furthermore, it is preferable to add water to the initial mixture of the heat treated recycled or renewable organic material. Adding a small percentage of water to the initial heat treated recycled or renewable organic material allows use of lower temperature and higher vacuum pressure while achieving the same level of Si removal than in normal evaporation. Even more importantly, there is less loss of volatile fatty acids, which reduces the amount of fatty acid waste to half compared to evaporation without water.

Accordingly in an example of the present invention water is added to the heat treated recycled or renewable organic material so that water content before evaporation step (c) is from 1 to 5 wt %, preferably from 1.5 to 4 wt % more preferably from 2 to 3 wt % of the total weight of the heat treated recycled or renewable organic material.

Figure 1:
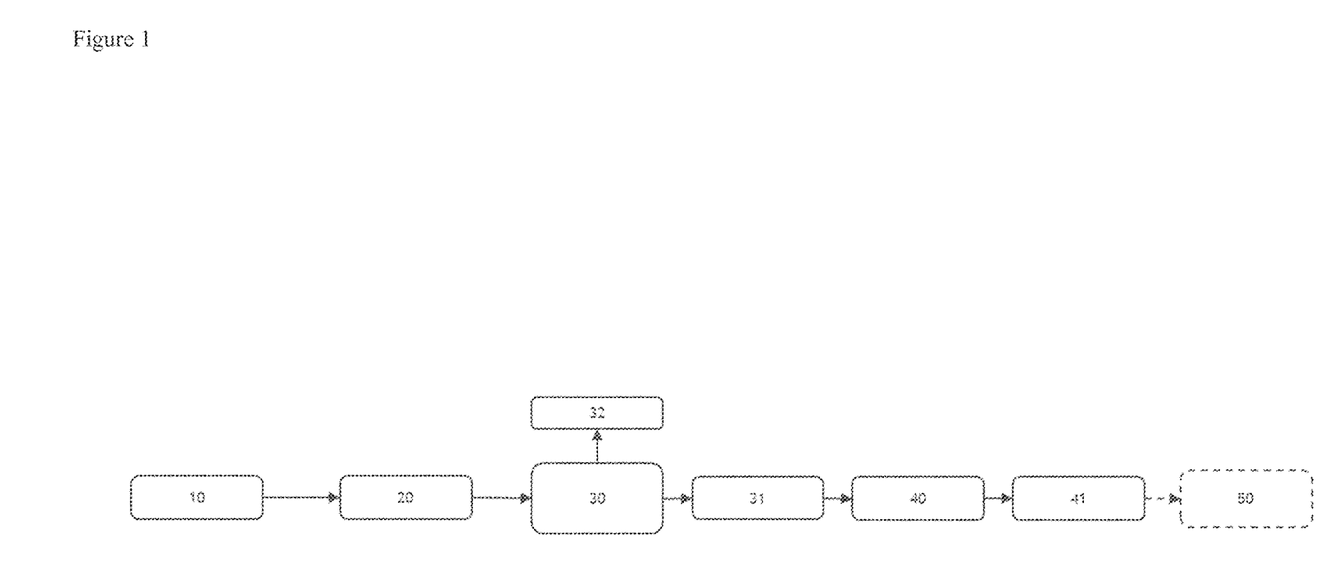
FIG. 1 illustrates a first exemplary process flow of the present method.
Figure 2:
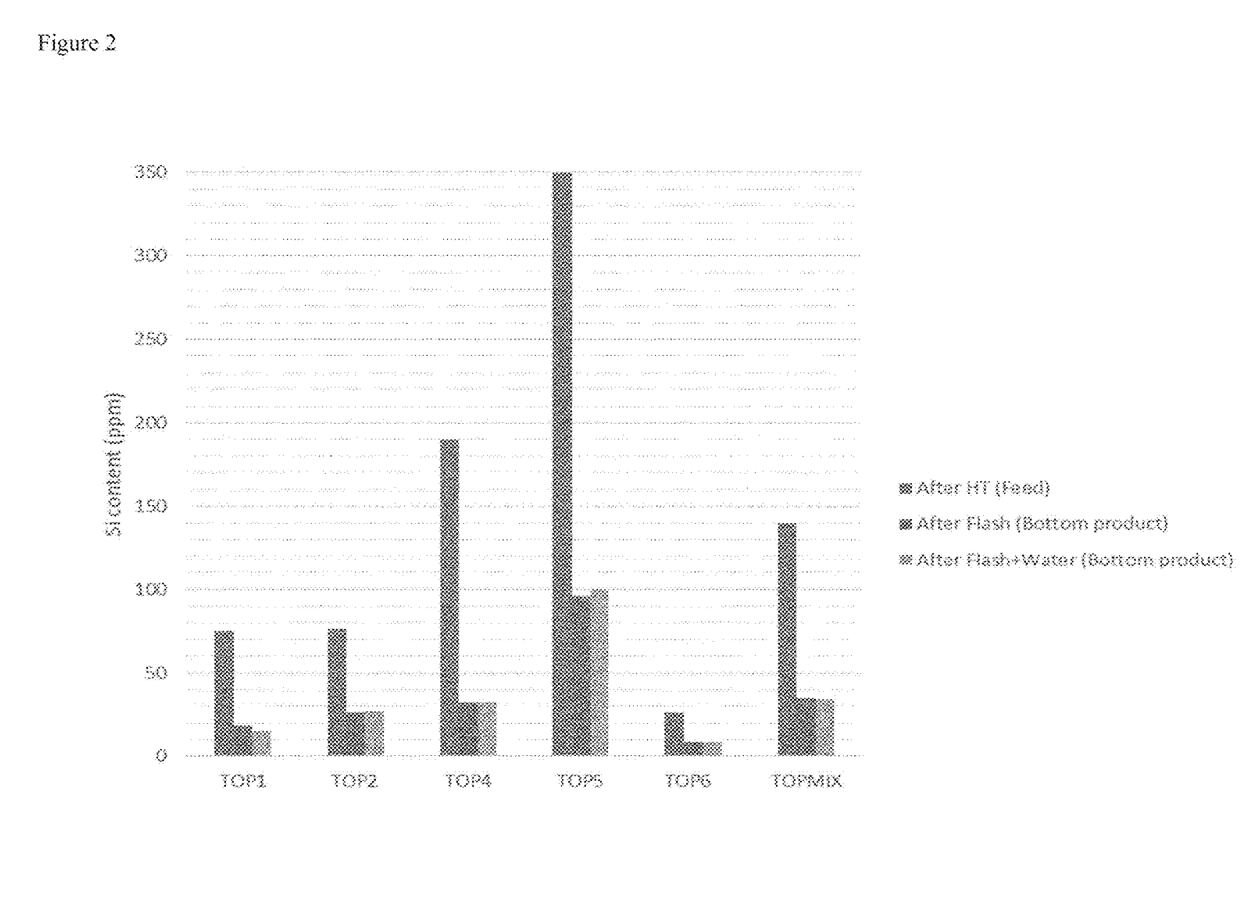
FIG. 2 shows average Si removal efficiency of the flash evaporation for both with and without water addition.

FIG. 1 illustrates a first exemplary process flow of the present method.

Referring to FIG. 1, a feed of recycled or renewable organic material, in particular tall oil pitch (TOP), 10 is subjected to a step of heat treating 20 the recycled or renewable organic material as discussed herein for step (b). The heat treated feed of recycled or renewable organic material is then evaporated 30 as discussed herein for step (c) and a bottom containing a heat treated recycled or renewable organic material fraction 31 comprising less than 50%, preferably less than 30%, of the original silicon content of the recycled or renewable organic material provided in step (a), and a vapor fraction 32 comprising the major part of volatile silicon compounds is obtained. The heat treated recycled or renewable organic material fraction may then be subjected to hydrotreatment, in particular hydrodeoxygenation, as discussed herein for step (d) 40 to obtain recycled or renewable organic material comprising less than 20%, preferably less than 10%, more preferably less than 5%, of the original silicon content of the recycled or renewable organic material provided in step (a) 41. The purified recycled or renewable organic material 41 may then be subjected to catalytic upgrading 50.

After the recycled or renewable organic material has been purified in accordance with the present method, it may be subjected to further processing e.g. catalytic upgrading. Such catalytic upgrading processes include, but are not limited to, catalytic cracking, catalytic hydrocracking, thermo-catalytic cracking, catalytic hydrotreatment, fluid catalytic cracking, catalytic ketonization, and catalytic esterification. Such processes require the recycled or renewable organic material to be sufficiently pure and free from impurities that may otherwise hamper the catalytic process or poison the catalyst(s) present in the process.

Accordingly the present invention further provides a process for producing recycled or renewable hydrocarbons, comprising steps of (x) purifying the recycled or renewable organic material as discussed herein, and (y) subjecting the purified recycled or renewable organic material to an oil refinery conversion process, wherein the oil refinery conversion process comprises altering the molecular weight of the feed, such hydrocracking, or steamcracking, removal of heteroatoms from the feed, such as thermal catalytic cracking, fluid catalytic cracking, or hydrotreating, in particular hydrodeoxygenating, or hydrodesulfurizing, altering the degree of saturation of the feed, such as hydrotreating, thermal catalytic cracking, or fluid catalytic cracking, rearranging the molecular structure of the feed, such as isomerizing, or any combination thereof to obtain at least one recycled or renewable hydrocarbon.

In a typical example of the present process the recycled or renewable hydrocarbon is a renewable traffic fuel or fuel component.

In an example of the present process, step (y) is hydrocracking. In such example, step (y) is preferably performed in a mild hydrocracking (MHC) refinery unit, in particular in a presence of a hydrocracking catalyst.

In another example of the present process, step (y) is steamcracking. In such example step (y) is preferably performed in a steamcracking unit.

In yet another example of the present process, step (y) is isomerization. In such example, step (y) is preferably performed in an isomerization unit.

In yet another example of the present process, step (y) is hydrotreating. In such example, step (y) is preferably performed in a hydrotreating unit.

In yet another example of the present process, step (y) is thermal catalytic cracking (TCC). In such example, step (y) is preferably performed in a thermal catalytic cracking unit.

In yet another example of the present process, step (y) is fluid catalytic cracking (FCC). In such example, step (y) is preferably performed in a fluid catalytic cracking unit.

EXAMPLES

Example 1

Crude and heat treated tall oil pitch (TOP) were subjected to distillation under varied conditions. Yield and silicon content of obtained distillate and bottom fractions are shown in Table 1 (reference) for crude TOP and in Table 2 for heat treated TOP.

TABLE 1

Crude TOP (Si = 54 ppm)

|  | p (kPa) | T (° C.) | Distillate | Bottom |
|---|---|---|---|---|
| Conditions | 0.1 | 147 | | |
| Yield | | | 4% | 96% |
| Si/ppm | | | 100 | 35 |
| Conditions | 1 | 194 | | |
| Yield | | | 6% | 94% |
| Si/ppm | | | 230 | 35 |
| Conditions | 3 | 222 | | |
| Yield | | | 6% | 94% |
| Si/ppm | | | 260 | 37 |
| Conditions | 5 | 236 | | |
| Yield | | | 5% | 95% |
| Si/ppm | | | 280 | 36 |

TABLE 2

Heat-treated TOP (Si = 25 ppm)

|  | p (kPa) | T (° C.) | Distillate | Bottom |
|---|---|---|---|---|
| Conditions | 0.1 | 145 | | |
| Yield | | | 4% | 96% |
| Si/ppm | | | 160 | 8 |
| Conditions | 1 | 193 | | |
| Yield | | | 3% | 97% |
| Si/ppm | | | 260 | 10 |
| Conditions | 3 | 220 | | |
| Yield | | | 5% | 95% |
| Si/ppm | | | 440 | 11 |
| Conditions | 5 | 235 | | |
| Yield | | | 5% | 95% |
| Si/ppm | | | 360 | 14 |

As can be seen from Table 1 and 2, silicon content in bottom fraction of heat-treated TOP is significantly lower than crude TOP's.

Example 2

Six tall oil pitch qualities were flash evaporated without water and with water (3%). Process conditions are shown in Table 3 (without water) and Table 4 (with water).

TABLE 3

Process conditions for the evaporation

| Flash conditions | TOP1 | TOP2 | TOP4 | TOP5 | TOP6 | TOPMIX |
|---|---|---|---|---|---|---|
| T run (° C.) | 172 | 184 | 190 | 228 | 218 | 190 |
| P (kPa) | 1 | 1 | 1 | 1 | 1 | 1 |
| wt % (bottom) | 93.9 | 91.5 | 93.3 | 93.7 | 93 | 93.5 |
| wt % (heads) | 6.1 | 8.5 | 6.7 | 6.3 | 7 | 6.5 |
| wt % of fatty acids (heads) | 5.5 | 6.8 | 6.2 | 5.9 | 6.8 | 6 |

TABLE 4

Process conditions for the evaporation with water addition

| Flash conditions | TOP1 | TOP2 | TOP4 | TOP5 | TOP6 | TOPMIX |
|---|---|---|---|---|---|---|
| Water added (%) | 3 | 3 | 3 | 3 | 3 | 3 |
| T run (° C.) | 160 | 160 | 160 | 160 | 160 | 160 |
| P (mbar) | 50 | 50 | 50 | 50 | 50 | 50 |
| w % (bottom) | 94.3 | 93.8 | 93.6 | 94.6 | 95.5 | 95.4 |
| w % (heads) | 5.7 | 6.2 | 6.4 | 5.4 | 4.5 | 4.6 |
| w % of fatty acids (heads) | 1.8 | 2.3 | 2.5 | 1.1 | 0.9 | 1 |

TABLE 5

Silicon contents after heat treatment (HT) and flash evaporation

| Silicon content, ppm | TOP1 | TOP2 | TOP4 | TOP5 | TOP6 | TOPMIX |
|---|---|---|---|---|---|---|
| After HT (Feed) | 75 | 76 | 190 | 350 | 26 | 140 |
| After Flash (without added water) | 18 | 26 | 32 | 96 | 8.5 | 35 |
| After Flash (3 wt % water added) | 15 | 27 | 32 | 100 | 8.6 | 34 |

The average Si-removal efficiency of the flash evaporation for both with and without water addition was 73% on average for all the 6 TOP qualities tested (Table 5). Even more importantly, there is less loss of volatile fatty acids, which reduces the amount of fatty acid waste to half compared to flashing without water (Table 4).

Example 3

Heat treated and flash evaporated TOP samples were hydrotreated (hydrodeoxygenated) in different temperatures. Other process conditions, pressure and weight hourly space velocity (WHSV), were kept constant. Pressure was 5000 kPa and WHSV was 0.95 1/h.

TABLE 6

Silicon contents of heat treated and flash evaporated TOP before and after HDO

| Silicon content, ppm | T = 291° C. | T = 320° C. | T = 333° C. | T = 350° C. |
|---|---|---|---|---|
| After HT and flash (Feed) | 43 | 43 | 43 | 43 |
| After HDO | 4 | 3.8 | 1.5 | 0.6 |

The Si-removal efficiency of the hydrotreatment for heat treated and flash evaporated TOP increases when temperature is increased (Table 6).

It will be obvious to a person skilled in the art that, as the technology advances, the inventive concept can be implemented in various ways. The invention and its embodiments are not limited to the examples described above but may vary within the scope of the claims.

The invention claimed is:

1. A method of purifying a recycled or renewable organic material, wherein the recycled or renewable organic material contains more than 1 ppm silicon as silicon compounds, the method comprising:
   (a) providing the recycled or renewable organic material;
   (b) heat treating the recycled or renewable organic material in a pressure from 500 to 5000 kPa to form a heat treated recycled or renewable organic material, wherein the at least part of silicon compounds present in the recycled or renewable organic material are converted to volatile silicon compounds; and
   (c) evaporating volatile silicon compounds from the heat treated recycled or renewable organic material;
   to obtain
   (i) a vapor fraction containing a major part of volatile silicon compounds, and (ii) a heat treated recycled or renewable organic material fraction containing less silicon than the recycled or renewable organic material provided in step (a).

2. A method as claimed in claim 1, wherein the method comprises:
   (d) hydrotreating the heat treated recycled or renewable organic material fraction in a presence of a hydrotreating catalyst to obtain purified recycled or renewable organic material.

3. A method as claimed in claim 2, wherein the purified recycled or renewable organic material contains less silicon than the recycled or renewable organic material provided in step (a).

4. A method as claimed in claim 2, wherein hydrotreating step (d) takes place under continuous hydrogen flow.

5. A method as claimed in claim 4, wherein in step (d) the continuous hydrogen flow has an H2/feed ratio from 500 to 2000 n-L/L.

6. A method as claimed in claim 2, wherein step (d) is performed at a temperature within a range of from 270 to 380° C.

7. A method as claimed in claim 2, wherein step (d) is performed under pressure from 4 to 20 MPa.

8. A method as claimed in claim 2, wherein the hydrotreating catalyst in step (d) contains at least one component selected from IUPAC group 6, 8 or 10 of the Periodic Table.

9. A method as claimed in claim 2, wherein the hydrotreating catalyst in step (d) is a supported Pd, Pt, Ni, NiW, NiMo or a CoMo catalysts and the support is zeolite, zeolite-alumina, alumina and/or silica, $NiW/Al_2O_3$, $NiMo/Al_2O_3$ or $CoMo/Al_2O_3$.

10. A method as claimed in claim 2, wherein step (d) is accomplished by (d1) hydrodeoxygenating (HDO) the heat treated recycled or renewable organic material fraction.

11. A method as claimed in claim 10, wherein step (d1) is performed in a presence of a HDO catalyst at 290 to 350° C. under pressure from 4 to 20 MPa and under continuous hydrogen flow.

12. A method as claimed in claim 10, wherein step (d1) is accomplished by (d1) hydrodeoxygenating (HDO) the heat treated recycled or renewable organic material fraction in a presence of a HDO catalyst at a temperature from 290 to 350° C. under pressure from 4 to 201\4 Pa and under continuous hydrogen flow to obtain purified recycled or renewable organic material containing less than 1 wt % of oxygen, and less than 20% of the original silicon content of the recycled or renewable organic material provided in step (a).

13. A method as claimed in claim 11, wherein in step (d1) the HDO catalyst is sulfided NiW, NiMo or CoMo catalyst.

14. A method as claimed in claim 11, wherein in step (d1) the continuous hydrogen flow has an H2/feed ratio from 500 to 2000 n-L/L.

15. A method as claimed in claim 1, wherein step (b) is performed at 180 to 325° C.

16. A method as claimed in claim 1, wherein a residence time is from 1 to 300 min in step (b).

17. A method as claimed in claim 1, wherein the pressure in step (b) is from 800 to 2000 kPa.

18. A method as claimed in claim 1, wherein step (c) is performed at from 145 to 250° C.

19. A method as claimed in claim 1, wherein the pressure in step (c) is 0.1 to 5 kPa.

20. A method as claimed in claim 1, wherein in step (c) from 1 to 10 wt % of the heat treated recycled or renewable organic material is evaporated.

21. A method as claimed in claim 1, wherein water is added to the heat treated recycled or renewable organic material so that a water content of the heat treated recycled or renewable material before evaporation step (c) is from 1 to 5 wt %.

22. A method as claimed in claim 1, wherein after step (c) silicon content of the heat treated recycled or renewable organic material fraction is less than 50%, of the original silicon content of the recycled or renewable organic material provided in step (a).

23. A method as claimed in claim 1, wherein the recycled or renewable organic material is selected from a group consisting of plant based fats and oils, animal based fats and oils, fossil waste-based oils, waste oils, algal oils and microbial oils.

24. A method as claimed in claim 1, wherein the recycled or renewable organic material is selected from a group consisting of crude tall oil (CTO), tall oil pitch (TOP), crude fatty acid (CFA), tall oil fatty acid (TOFA) and distilled tall oil (DTO).

25. A process for producing recycled or renewable hydrocarbons, the method comprising:
   (x) purifying the recycled or renewable organic material as claimed in claim 1; and
   (y) subjecting the purified recycled or renewable organic material to an oil refinery conversion process, wherein the oil refinery conversion process includes altering a molecular weight of the feed, removal of heteroatoms from the feed, altering a degree of saturation of the feed, rearranging the molecular structure of the feed, or any combination thereof to obtain at least one recycled or renewable hydrocarbon.

26. A process as claimed in claim 25, wherein step (y) is hydrocracking.

27. A process as claimed in claim 26, wherein step (y) is performed in a mild hydrocracking (MHC) refinery unit.

28. A process as claimed in claim 26, wherein step (y) is performed in a presence of a hydrocracking catalyst.

29. A process as claimed in claim 25, wherein step (y) is steamcracking.

30. A process as claimed in claim 25, wherein step (y) is isomerization.

31. A process as claimed in claim 25, wherein step (y) is hydrotreating.

32. A process as claimed in claim 25, wherein step (y) is thermal catalytic cracking.

33. A process as claimed in claim 25, wherein step (y) is fluid catalytic cracking.

* * * * *